United States Patent
Oztaskent et al.

(10) Patent No.: US 11,411,852 B2
(45) Date of Patent: *Aug. 9, 2022

(54) METHODS, SYSTEMS, AND MEDIA FOR DETECTING THE PRESENCE OF A DIGITAL MEDIA DEVICE ON A NETWORK

(71) Applicant: Google LLC, Mountain View, CA (US)

(72) Inventors: Ant Oztaskent, Surrey (GB); Yaroslav Volovich, Cambridge (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/240,288

(22) Filed: Apr. 26, 2021

(65) Prior Publication Data

US 2021/0250269 A1    Aug. 12, 2021

Related U.S. Application Data

(63) Continuation of application No. 16/518,336, filed on Jul. 22, 2019, now Pat. No. 10,992,564, which is a
(Continued)

(51) Int. Cl.
*G06F 15/167* (2006.01)
*H04L 43/10* (2022.01)
(Continued)

(52) U.S. Cl.
CPC .......... *H04L 43/10* (2013.01); *H04L 12/2805* (2013.01); *H04L 12/2809* (2013.01);
(Continued)

(58) Field of Classification Search
CPC ....... G06F 16/00; H04B 1/38; H04L 12/2805; H04L 12/2809; H04L 2012/2849; H04L 41/12; H04L 43/10; H04L 67/16
(Continued)

(56) References Cited

U.S. PATENT DOCUMENTS 7,539,152 B2    5/2009  Morioka et al.
8,151,280 B2    4/2012  Sather et al.
(Continued)

FOREIGN PATENT DOCUMENTS

CN    103152234    6/2013
EP    1802038      1/2009
(Continued)

OTHER PUBLICATIONS

Bettstetter et al., "A Comparison of Service Discovery Protocols and Implementation of the Service Location Protocol," In the Proceedings of the 6th EUNICE Open European Summer School: Innovative Internet Applications, Twente, NL, Sep. 2000, pp. 1-8.
(Continued)

*Primary Examiner* — Liang Che A Wang
(74) *Attorney, Agent, or Firm* — Byrne Poh LLP

(57) ABSTRACT

Methods, systems, and media for detecting the presence of a digital media device on a network are provided. In some embodiments, methods for detecting a presence of a particular type of digital media device is provided, the methods comprising: identifying cached device details for devices previously associated with the network; performing a simple device discovery protocol (SSDP) on the network, and substantially concurrently sending a unicast message to an address associated with the identified cached digital media device using hypertext transfer protocol (HTTP); and indicating the presence of a digital media device on the network in response to either (i) receiving a response to the unicast message, or (ii) determining that a type of a device discovered using SSDP is the same as the particular device type.

21 Claims, 5 Drawing Sheets

Related U.S. Application Data continuation of application No. 15/826,356, filed on Nov. 29, 2017, now Pat. No. 10,361,941, which is a continuation of application No. 13/961,329, filed on Aug. 7, 2013, now Pat. No. 9,853,875.

(60) Provisional application No. 61/839,263, filed on Jun. 25, 2013.

(51) Int. Cl.

| | | |
|---|---|---|
| *H04L 41/12* | (2022.01) | |
| *H04L 67/51* | (2022.01) | |
| *H04L 12/28* | (2006.01) | |
| *G06F 16/00* | (2019.01) | |
| *H04B 1/38* | (2015.01) | |

(52) U.S. Cl.
CPC ............. *H04L 41/12* (2013.01); *H04L 67/16* (2013.01); *G06F 16/00* (2019.01); *H04B 1/38* (2013.01); *H04L 2012/2849* (2013.01)

(58) Field of Classification Search
USPC ................................ 709/200, 213, 223, 224
See application file for complete search history.

(56) References Cited

U.S. PATENT DOCUMENTS

| | | | |
|---|---|---|---|
| 8,180,891 | B1 | 5/2012 | Harrison |
| 8,379,668 | B2 | 2/2013 | Poder et al. |
| 8,560,775 | B1* | 10/2013 | McDuffee ............. G06F 3/0683 711/114 |
| 9,578,482 | B2* | 2/2017 | Tokunaga ........... H04L 41/0809 |
| 2002/0144233 | A1* | 10/2002 | Chong ...................... G06F 8/20 717/105 |
| 2003/0101294 | A1 | 5/2003 | Saint-Hilaire et al. |
| 2004/0120344 | A1* | 6/2004 | Sato ...................... H04L 69/329 370/465 |
| 2005/0108331 | A1* | 5/2005 | Osterman ............... H04L 29/06 709/204 |
| 2006/0184693 | A1 | 8/2006 | Rao et al. |
| 2008/0016203 | A1 | 1/2008 | Song et al. |
| 2008/0040659 | A1* | 2/2008 | Doyle ................. G06F 16/9577 715/236 |
| 2008/0109545 | A1* | 5/2008 | Shah ..................... G06F 16/958 709/223 |
| 2008/0304408 | A1 | 12/2008 | Kraemer et al. |
| 2009/0210525 | A1 | 8/2009 | Huetter et al. |
| 2009/0327496 | A1 | 12/2009 | Klemts et al. |
| 2010/0094806 | A1 | 4/2010 | Apostolides et al. |
| 2011/0055928 | A1 | 3/2011 | Brindza |
| 2011/0179184 | A1* | 7/2011 | Breau ................. H04L 65/4076 709/231 |
| 2013/0080486 | A1 | 3/2013 | Bahnck |
| 2014/0010150 | A1* | 1/2014 | Agarwal ................. H04W 4/02 370/328 |
| 2014/0317662 | A1* | 10/2014 | Oztaskent ............ H04N 21/431 725/48 |

FOREIGN PATENT DOCUMENTS

| | | |
|---|---|---|
| JP | 2011081822 | 4/2011 |
| WO | WO 2013081084 | 6/2013 |

OTHER PUBLICATIONS

CSP Search Report at KIPO dated Sep. 7, 2018 in U.S. Appl. No. 15/826,356.
International Search Report and Written Opinion dated Sep. 4, 2014 in International Patent Application No. PCT/US2014/044123.
Kumar et al., "An Architectural Framework for Mobile Device Interaction with Consumer Home Network Appliances", In Proceedings of the IEEE Consumer Communications and Networking Conference (CCNC '12), Las Vegas, NV, US, Jan. 14-17, 2012, pp. 661-666.
Notice of Allowance dated Jan. 30, 2019 in KR Patent Application No. 10-2015-7037185.
Notice of Allowance dated Mar. 7, 2019 in U.S. Appl. No. 15/826,356.
Notice of Allowance dated Aug. 15, 2017 in U.S. Appl. No. 13/961,329.
Notice of Allowance dated Dec. 30, 2020 in U.S. Appl. No. 16/518,336.
Office Action dated Mar. 25, 2016 in U.S. Appl. No. 13/961,329.
Office Action dated Apr. 28, 2018 in CN Patent Application No. 201480036166.7.
Office Action dated May 22, 2015 in U.S. Appl. No. 13/961,329.
Office Action dated Aug. 10, 2020 in U.S. Appl. No. 16/518,336, pp. 2-6.
Office Action dated Sep. 22, 2016 in U.S. Appl. No. 13/961,329.
Office Action dated Oct. 19, 2018 in U.S. Appl. No. 15/826,356.
Office Action dated Nov. 16, 2018 in KR Patent Application No. 10-2015-7037185.

* cited by examiner

METHODS, SYSTEMS, AND MEDIA FOR DETECTING THE PRESENCE OF A DIGITAL MEDIA DEVICE ON A NETWORK

CROSS-REFERENCE TO RELATED APPLICATIONS

This application is a continuation of U.S. patent application Ser. No. 16/518,336, filed Jul. 22, 2019, which is a continuation of U.S. patent application Ser. No. 15/826,356, filed Nov. 29, 2017, which is a continuation of U.S. patent application Ser. No. 13/961,329, filed Aug. 7, 2013, which claims the benefit of U.S. Provisional Patent Application No. 61/839,263, filed Jun. 25, 2013, each of which is hereby incorporated by reference herein in its entirety.

TECHNICAL FIELD

The disclosed subject matter relates to methods, systems, and media for detecting the presence of a media playback device on a network.

BACKGROUND

The number and types of devices, such as televisions, set-top boxes, game consoles, personal computers, tablet computers, etc., that may be connected to a local network, such as a home network, at any given time has increased rapidly. Knowledge about the presence of such devices on the network can be used in various applications, but processes of discovering the presence of such devices on the network is often time consuming and may be unreliable, or may be limited to a proprietary discovery process only useful for certain brands of devices.

Accordingly, it is desirable to provide new methods, systems, and media for detecting the presence of a digital media device on a network.

SUMMARY

In accordance with various implementations of the disclosed subject matter, methods, systems, and media for detecting the presence of a media playback device on a network are provided.

In accordance with some implementations of the disclosed subject matter, methods for detecting a presence of a digital media device are provided, the methods comprising: receiving, using a hardware processor, an instruction to detect a presence of a particular type of digital media device on a local area network; identifying cached device details from a local cache corresponding to one or more devices previously associated with the network; performing a simple device discovery protocol (SSDP) search on the network requesting details for devices on the network; receiving device details in response to the SSDP search from at least one digital media device; determining whether a device type of the at least one digital media device is included in the received device details; comparing the received device details to the cached device details to determine whether the digital media device corresponds to one of the one or more devices previously associated with the network; querying a device type identification database using at least a portion of the received requested device details upon determining (a) that the received requested details do not include the device type of the digital media device and (b) that the digital media device does not correspond to one of the one or more devices previously associated with the network; receiving an identified device type of the digital media device in response to querying the device type identification database; storing at least a portion of the received device details and the identified device type of the media playback device in the local cache; identifying a cached digital media device of the particular type from among the one or more devices previously associated with the network; sending a unicast message to an address associated with the identified cached digital media device using hypertext transfer protocol (HTTP), wherein the unicast message is sent substantially concurrently with performing the SSDP search; and indicating the presence of the particular type of digital media device on the network in response to either (c) receiving a response to the unicast message, or (d) determining that the type of the identified device type is the same as the particular device type.

In accordance with some implementations of the disclosed subject matter, systems for detecting a presence of a digital media device are provided, the systems comprising: a hardware processor that is configured to: receive an instruction to detect a presence of a particular type of digital media device on a local area network; identify cached device details from a local cache corresponding to one or more devices previously associated with the network; perform a simple device discovery protocol (SSDP) search on the network requesting details for devices on the network; receive device details in response to the SSDP search from at least one digital media device; determine whether a device type of the at least one digital media device is included in the received device details; compare the received device details to the cached device details to determine whether the digital media device corresponds to one of the one or more devices previously associated with the network; query a device type identification database using at least a portion of the received requested device details upon determining (a) that the received requested details do not include the device type of the digital media device and (b) that the digital media device does not correspond to one of the one or more devices previously associated with the network; receive an identified device type of the digital media device in response to querying the device type identification database; store at least a portion of the received device details and the identified device type of the media playback device in the local cache; identify a cached digital media device of the particular type from among the one or more devices previously associated with the network; send a unicast message to an address associated with the identified cached digital media device using hypertext transfer protocol (HTTP), wherein the unicast message is sent substantially concurrently with performing the SSDP search; and indicate the presence of the particular type of digital media device on the network in response to either (c) receiving a response to the unicast message, or (d) determining that the type of the identified device type is the same as the particular device type.

In accordance with some implementations of the disclosed subject matter, non-transitory computer-readable media containing computer executable instructions that, when executed by a processor, cause the processor to perform methods for detecting a presence of a digital media device are provided, the methods comprising: receiving an instruction to detect a presence of a particular type of digital media device on a local area network; identifying cached device details from a local cache corresponding to one or more devices previously associated with the network; performing a simple device discovery protocol (SSDP) search on the network requesting details for devices on the network; receiving device details in response to the SSDP search from at least one digital media device; determining whether a device type of the at least one digital media device is included in the received device details; comparing the received device details to the cached device details to determine whether the digital media device corresponds to one of the one or more devices previously associated with the network; querying a device type identification database using at least a portion of the received requested device details upon determining (a) that the received requested details do not include the device type of the digital media device and (b) that the digital media device does not correspond to one of the one or more devices previously associated with the network; receiving an identified device type of the digital media device in response to querying the device type identification database; storing at least a portion of the received device details and the identified device type of the media playback device in the local cache; identifying a cached digital media device of the particular type from among the one or more devices previously associated with the network; sending a unicast message to an address associated with the identified cached digital media device using hypertext transfer protocol (HTTP), wherein the unicast message is sent substantially concurrently with performing the SSDP search; and indicating the presence of the particular type of digital media device on the network in response to either (c) receiving a response to the unicast message, or (d) determining that the type of the identified device type is the same as the particular device type.

In accordance with some implementations of the disclosed subject matter, systems for detecting a presence of a digital media device are provided, the systems comprising: receiving means for receiving an instruction to detect a presence of a particular type of digital media device on a local area network; identifying means for identifying cached device details from a local cache corresponding to one or more devices previously associated with the network; simple device discovery protocol (SSDP) search means for performing a SSDP search on the network requesting details for devices on the network; receiving means for receiving device details in response to the SSDP search from at least one digital media device; determining means for determining whether a device type of the at least one digital media device is included in the received device details; comparing means for comparing the received device details to the cached device details to determine whether the digital media device corresponds to one of the one or more devices previously associated with the network; querying means for querying a device type identification database using at least a portion of the received requested device details upon determining (a) that the received requested details do not include the device type of the digital media device and (b) that the digital media device does not correspond to one of the one or more devices previously associated with the network; receiving means for receiving an identified device type of the digital media device in response to querying the device type identification database; storing means for storing at least a portion of the received device details and the identified device type of the media playback device in the local cache; identifying means for identifying a cached digital media device of the particular type from among the one or more devices previously associated with the network; sending means for sending a unicast message to an address associated with the identified cached digital media device using hypertext transfer protocol (HTTP), wherein the unicast message is sent substantially concurrently with performing the SSDP search; and indicating means for indicating the presence of the particular type of digital media device on the network in response to either (c) receiving a response to the unicast message, or (d) determining that the type of the identified device type is the same as the particular device type.

In some implementations, the system further comprises sending means for sending a query to a remote server that hosts the device type identification database.

In some implementations, the SSDP search means further comprises: sending means for sending a user datagram protocol (UDP) multicast message on the network that requests device details for devices that are connected to the network; and receiving means for receiving a UDP unicast reply that includes a universally unique identifier (UUID) of the at least one digital media device and a uniform resource locator (URL) for a service description file corresponding to the at least one digital media device.

In some implementations, the SSDP search means further comprises sending means for sending a unicast message requesting the service description file from the replying device to an address associated the identified cached digital media device using HTTP; and checking means for checking the service description file for the device type.

In some implementations the system further comprises comparing means for comparing the received UUID to the cached device details to determine whether device details are already cached for the responding device; and comparing means for comparing the received device details to the cached device details further comprises comparing the received URL to a URL in the cached device details to determine if the URL has changed.

In some implementations, the particular device type is a television.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
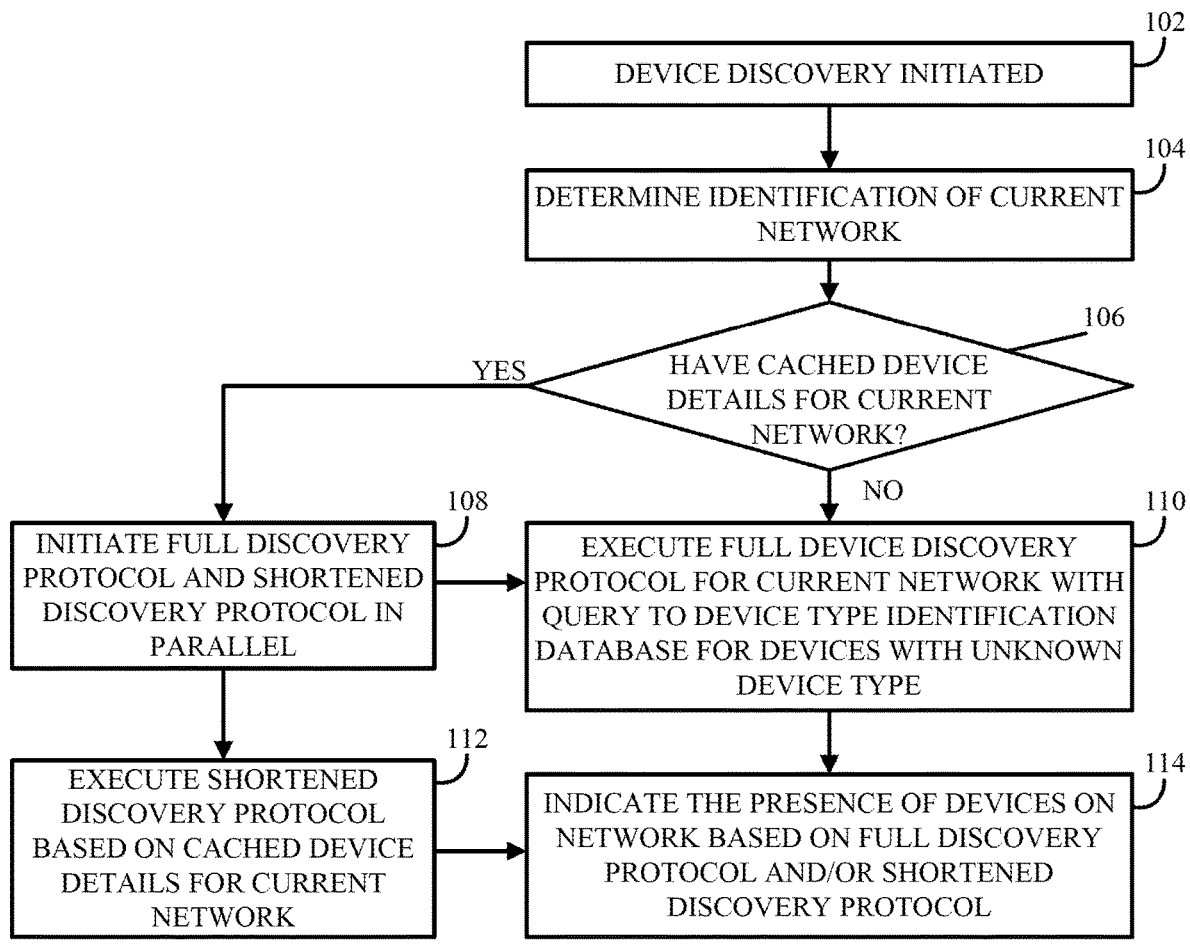
FIG. 1 shows an example of a process for detecting the presence of a digital media device on a network in accordance with some implementations of the disclosed subject matter.

In accordance with various implementations, mechanisms (which can include methods, systems, and/or media) for detecting the presence of a media playback device on a network are provided.

In some implementations, the mechanisms described herein can discover the presence of a device on a network for use in another task. For example, the presence of a device on a network can be used as a proxy for determining whether a user of a device executing the mechanisms described herein is likely to be physically present near such a discovered device. In a more particular example, the presence of a television on the network can be used to determine that a user may be watching television. This information can then be used to initiate an action by a device executing the mechanisms described herein, such as prompting the user to perform a search based on what is currently being presented by the television.

In some implementations, the mechanisms described herein can include a full discovery protocol for initially discovering devices on a network, and a shortened discovery protocol that checks for the presence of devices that were previously detected on the network using the full discovery protocol. These protocols can be executed substantially concurrently by a device using the mechanisms described herein to discover new devices on a network, discover previously discovered devices that have received a new address on the network, and/or check for the presence of previously discovered devices. The shortened discovery protocol can more quickly check for the presence of previously discovered devices as it can directly address such previously discovered devices, rather than sending a request to all devices on the network and waiting a predetermined amount of time for responses.

In some implementations, device details (e.g., an identifier of the device, a manufacturer, model name, model number, etc.) for devices discovered using the full discovery protocol can be stored for later use during execution of the shortened discovery protocol and/or the full discovery protocol. For example, the device details can be stored in a cache memory associated with the mechanisms described herein. Such device details can be stored in association with a particular network on which the device was discovered. These device details can be obtained from devices on the network discovered during execution of the full discovery protocol. In some implementations, the device details can include a device type of a device on the network such as television, set-top box, etc. Additionally or alternatively, a device type of device on the network can be determined by querying a database that includes device details and corresponding device types.

In some implementations, the mechanisms described herein can indicate the presence of devices discovered on the network using the shortened discovery protocol and/or the full discovery protocol. For example, the mechanisms described herein can indicate the presence and device details of devices discovered on the network for use in sharing information from a device using the mechanisms described herein and/or accessing information from a device discovered on the network. As another example, the mechanisms described herein can indicate that a particular type of device (e.g., a television) is present on the network, which can be an indication that the user may be in the physical presence of a television.

Turning to FIG. 1, an example 100 of a process for detecting the presence of a digital media device on a network is shown in accordance with some implementations of the disclosed subject matter. In some implementations, process 100 can be executed by any suitable device connected to a local network (e.g., a LAN, a wireless LAN, a wired/wireless LAN, or any other suitable local network) to detect the presence of devices on the network. Although any suitable device (e.g., as described below in connection with FIG. 4) can execute process 100 for discovering the presence of a device on a network, the following examples are described in connection with process 100 being executed by a mobile device such as a smartphone, tablet computer, wearable computer, etc.

At 102, process 100 can initiate device discovery in response to receiving an instruction from the mobile device executing process 100 to initiate device discovery on the network to which the mobile device is connected (e.g., a current network). Process 100 can be initiated by the mobile device at any suitable time or times and for any suitable reason or reasons. For example, an application running on the mobile device can initiate process 100 to determine whether the mobile device is on the same network as a digital media device such as a television.

At 104, process 100 can determine an identification of the network to which the mobile device executing process 100 is currently connected. An identification of the current network can be determined using any suitable technique or techniques. For example, process 100 can look up a Basic Service Set Identification (BSSID) of the current network to which the mobile device is connected. In such an example, the BSSID can be a Media Access Control (MAC) address assigned to an access point being used to access the current network and can be unique to a particular access point. As another example, process 100 can look up a Service Set Identifier (SSID) of the current network, which may not be unique to a single access point (e.g., access points that each have a unique BSSID).

At 106, process 100 can check a cache of previously determined device details to determine whether there are any cached device details associated with the current network. For example, each time process 100 is executed for a particular network, process 100 can cache device details of devices discovered on that particular network in association with the identification of the particular network.

If process 100 determines that there are cached device details associated with the current network ("YES" at 106), process 100 can proceed to 108. At 108, process 100 can initiate both a full discovery protocol (e.g., for discovering all devices on the current network) and a shortened discovery protocol (e.g., for determining whether a cached device is currently on the network) in parallel (e.g., concurrently). Although, the full discovery protocol and the shortened discovery protocol are described as being initiated in parallel, it is recognized that, due to the operation of a processor executing process 100 the full discovery protocol and the shortened discovery protocol may not be executed at the same time (e.g., simultaneously) but may be executed during the same period of time, rather than being executed serially (e.g., executing one protocol to completion and then executing another protocol). After initiating the full discovery protocol and the shortened discovery protocol, process 100 can proceed to both 110 to execute the full discovery protocol and to 112 to execute the shortened discovery protocol.

Otherwise, if process 100 determines that there are no cached device details for the network ("NO" at 106), process 100 can proceed to 110 to execute the full device discovery protocol.

At 110, process 100 can execute a full discovery protocol on the network for determining the details of any devices found on the current network. Such a full discovery protocol can include any suitable technique or techniques for determining device details for devices having an address on a network (e.g., an IP address, a MAC address, etc.) that may be unknown at the initiation of the full discovery protocol. It is recognized that the address of devices on the network may be known (e.g., an address for the device may be cached) or unknown at the initiation of the full discovery protocol.

In some implementations, the full discovery protocol can include sending a multicast message to all devices on the network requesting predetermined device details from the devices on the network. Additionally, the multicast message can be addressed to certain types of devices and/or can be compatible with a discovery protocol for devices that comply with a particular standard (e.g., Universal Plug and Play (UPnP), Digital Living Network Alliance (DLNA), etc.). In some implementations, process 100 can wait a predetermined amount of time for responses to the multicast message, which can be in the form of a unicast message addressed to the mobile device executing process 100. Such a unicast message can include one or more device details, which can include a device identification number (e.g., a Universal Unique Identifier (UUID)), an address of the device on the network, a location where additional device details can be found, a manufacturer of the device, a text string including a name of the device, or any other suitable device details). Additionally, in some implementations, the full discovery protocol can include requesting additional device details from devices that responded by sending a unicast message to an address and/or location included in a reply by the device to the multicast message. Such additional details can include a name of the device (e.g., a text name of the device if a name has been assigned to the device), a manufacturer of the device, a model name of the device, a model number of the device, a model description of the device, a serial number of the device, and/or any other suitable device details of the device.

In some implementations, a device type (e.g., television, game console, optical media player, set-top box, etc.) and/or description of the device's capabilities can be included in the response to the message sent by process 100 using the mobile device executing process 100. Alternatively, the device type and/or a description of the device's capabilities may not be included in any reply.

In some implementations, process 100 can use device details included in a response to the multicast message and/or in a reply to a unicast message sent to a particular device to query a device identification database for identifying a device type of a device based on other device details of the device. As described below in connection with FIG. 2, such a device identification database can be located on a server that can be queried remotely. Additionally or alternatively, the device identification database can be stored on a device executing process 100 (e.g., a mobile device), located on a device connected to the network (e.g., a personal computer connected to the network, network attached storage connected to the network, etc.), or at any other suitable location. In some implementations, the device identification database can include a database of device details and can respond to queries that include device details (e.g., a manufacturer, model name, model number, etc.) with a device type and/or description of the capabilities of the device that match with such device details. In some cases, the device identification database can include details for only a specified type of device (e.g., televisions, set-top boxes, etc.) or can contain device details for multiple different types of devices. Additionally, multiple device identification databases can be made available for identifying different types of devices. It is understood that, although the device identification database is described as a database, it can be organized using any suitable format and information can be accessed using any suitable technique or techniques.

In some implementations, the device identification database can be located at a server that returns a device type in response to receiving a query that includes information on a particular device, without maintaining records of an address from which the query originated and/or the device details included in the query. In some implementations, the device identification database can be periodically updated with additional device details to provide device types for additional devices. For example, the device identification database can be updated weekly, daily, every twelve hours, etc., from any suitable source or sources. For example, information can be periodically imported in any suitable form (e.g., as comma-separated values (CSV), as a spreadsheet, as database entries, etc.) from a database of device details. In a more particular example, device details can be imported from a DLNA database that includes device details for various devices. Additionally or alternatively, the device identification database can be updated manually. For example, an administrator of the device identification database can enter values for various device details and/or a device type for various devices.

In some implementations, the database can track queries that contain device details that cannot be determined to correspond to a known device type. For example, if a match cannot be found for particular device details, the device details included in the query can be logged as corresponding to an unknown device. In some implementations, all queries that are logged as unknown devices can be aggregated and unknown devices that have been queried more than a threshold number of times within a predetermined period of time (e.g., daily, weekly, monthly, or any other suitable period of time) can be investigated (e.g., by a person, using artificial intelligence, etc.) to determine a device type corresponding to the unknown device. Additionally or alternatively, unknown devices that correspond to the most queries from among all queries submitted for unknown devices can be investigated periodically. Such logging of queries that do not correspond to a known device can log only the device details included in the query and the time of the query without logging information related to where the query originated (e.g., without logging user IP address information or other user identifying information).

In some implementations, process 100 can receive a response to a query of the device identification database that includes a device type for the queried device details. Process 100 can identify a device type of each device on the network using the full device discovery protocol at 110.

Figure 2:
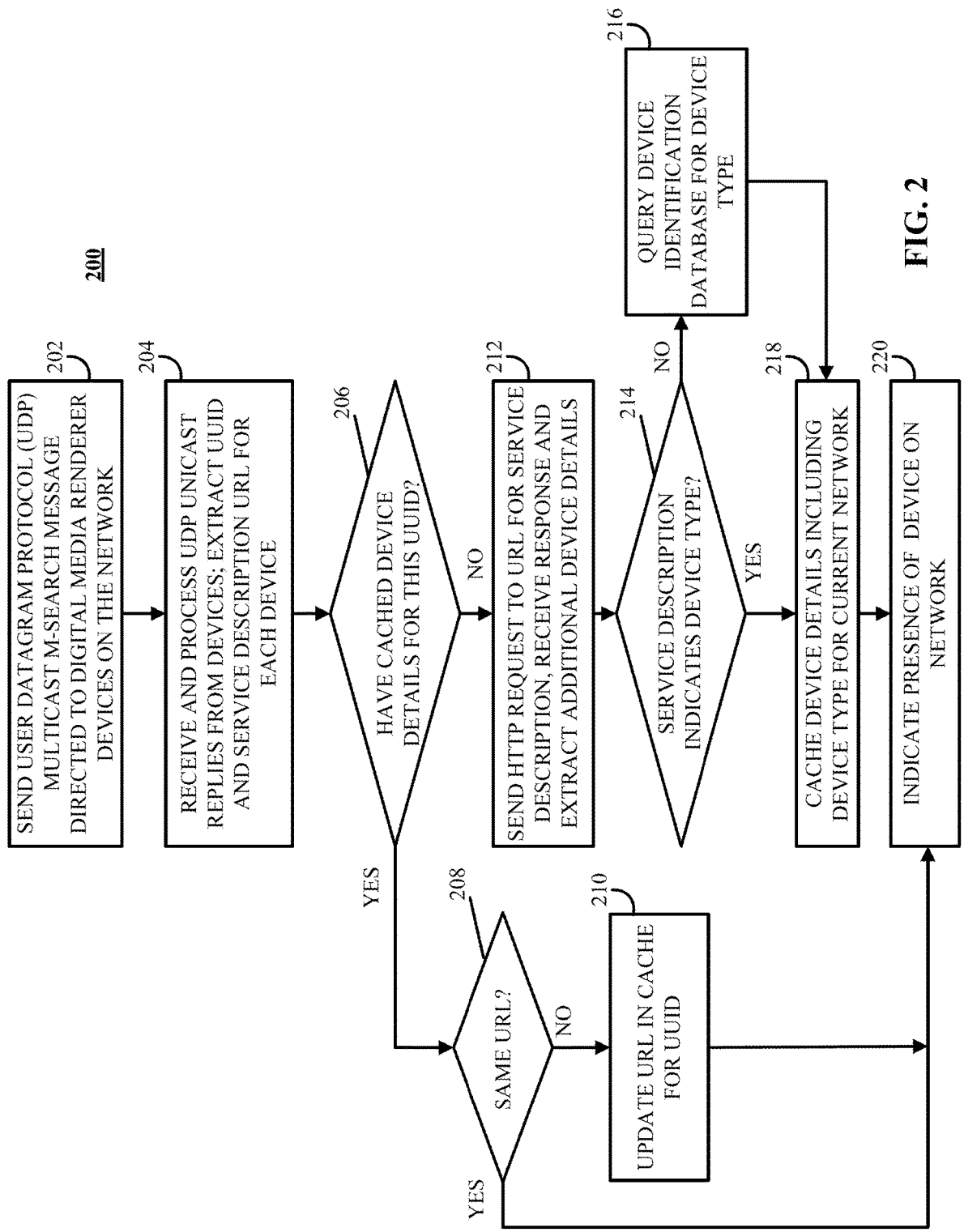
FIG. 2 shows an example of a full discovery protocol for discovering the presence of one or more digital media devices on a network in accordance with some implementations of the disclosed subject matter.

FIG. 2 shows an example 200 of a process for executing a full device discovery protocol that can be used at 110 in accordance with some implementations of the disclosed subject matter. Process 200 can be a modified version of the Simple Service Discovery Protocol (SSDP), but can include one or more additional elements and/or exclude one or more elements of the SSDP. At 202, after a full device discovery protocol has been initiated, process 200 can cause the mobile device executing process 200 to send a User Datagram Protocol (UDP) multicast message on the current network. In some implementations, the UDP can include an M-Search message directed to digital media devices. Such digital media devices can include digital media renderers and/or digital media servers (e.g., as defined in "DLNA Guidelines December 2011, Part 1: Architecture and Protocols" technical specification, which is hereby incorporated by reference herein in its entirety), digital media players, or any other suitable device that outputs, processes, and/or presents media content. In some implementations, the UDP multicast message can include an address of the device sending the message (e.g., the network address of the mobile device executing process 200), and can include a time period during which replies are to be sent. Such a time period can be any suitable time period such as one second, two seconds, etc., and can be set based on any suitable factors. An example of SSDP is described in "UPnP™ Device Architecture 1.1" technical specification as revised Oct. 15, 2008, which is hereby incorporated by reference herein in its entirety. In some embodiments, SSDP as used herein can be a modified form of SSDP and may add elements and/or omit elements as compared to SSDP as described in "UPnP™ Device Architecture 1.1".

At 204, process 200 can receive and process UDP unicast replies from any devices on the network that respond to the UDP multicast message sent at 202 to extract device details included in the UDP unicast reply. For example, process 200 can extract a UUID for the replying device and a uniform resource locator (URL) at which additional device details can be found. Such a URL can specify any suitable address at which the additional device details can be found, such as an address of the responding device, an address of a remote server, or any other suitable location. In a more particular example, a Service Description file of the responding device can be located at the URL, and can include one or more additional device details, such as a name of the device, an identification of the manufacturer of the device, a model name of the device, a model number of the device, a device type of the device, and/or any other suitable device details. The Service Description file can be in any suitable format, such as Extensible Markup Language (XML), HyperText Markup Language (HTML), as a text file, or using any other suitable formatting. In some implementations, the Service Description file can include various fields that identify a particular type of information as corresponding to particular device details. For example, the Service Description file can include the following fields: <friendlyName>, which can include a short text title for the device (e.g., less than 32 characters); <manufacturer>, which can include a name of the manufacturer of the device; <modelName>, which can include a manufacturer assigned model name of the device; <modelNumber>, which can include a manufacturer assigned model number, <modelDescription>, which can include a longer description of the device (e.g., less than 128 characters); <X_deviceCategory>, which can indicate a device type if present; and/or any other suitable fields. In some implementations, such fields can be formatted using any suitable formatting. For example, these fields can be formatted to comply with the UPnP standard described above.

At 206, process 200 can check cached device details for the current network (if any exist) to determine whether device details are cached for a responding device. In some implementations, process 200 can compare the UUID extracted at 204 to UUIDs of cached devices to determine whether cached device details have already been determined for the responding device. If cached device details exist for the device ("YES" at 206), process 200 can proceed to 208.

At 208, process 200 can determine whether the URL extracted at 204 is the same as the URL stored in the cache for the responding device. A device that was previously discovered (e.g., upon previously executing process 100 and/or process 200) can include a different URL for various reasons. For example, a device can have a different URL if the device was assigned a new Internet Protocol (IP) address, or for any other suitable reason. If the URL is the same ("YES" at 208), process 200 can proceed to 220 (described below). Otherwise, if the URL is not the same ("NO" at 208), process 200 can proceed to 210.

At 210, process 200 can update the URL in the cache for the device corresponding to the UUID extracted at 204. For example, the URL can be updated such that, the next time process 100 is executed on the current network, the shortened device discovery protocol can be executed for the responding device with an updated URL. In some implementations, after updating the cached information for the responding device at 210, process 200 can proceed to 220. Additionally or alternatively, in some implementations, if the URL is not the same ("NO" at 208), process 200 can proceed to 212 (not shown) to refresh all details for the device. In some implementations, all details for a device can be refreshed periodically if the URL has changed (e.g., "NO" at 208), or if the URL has not changed, but a predetermined time (e.g., seven days, ten days, a month, etc.) has passed since device details were refreshed for the device.

Referring back to 206, if cached details do not exist for the UUID extracted at 204 ("NO" at 206), process 200 can proceed to 212. Additionally, if device details exist for the UUID but a device type is not included in the device details, process 200 can proceed to 212-218 to determine the device type. For example, if the device was previously discovered on the current network, but the device type could not be determined for any reason, process 200 can attempt to determine the device type again.

At 212, process 200 can send a request to the URL extracted at 204 to retrieve the Service Description file for the responding device using HyperText Transfer Protocol (HTTP). Additionally, in some implementations, process 200 can receive a response to the HTTP request for the Service Description file from the responding device in any suitable format (e.g., as described above). In a more particular example, the Service Description file can be an XML document that includes various fields, such as a field for the name of the device, a field for the manufacturer of the device, a field for the model name of the device, a field for the model number of the device, a field for a model description, a field for a device type of the device (e.g., television, set-top box, etc.), and/or fields for any other suitable information. In some implementations, process 200 can extract device details from the Service Description file for caching and/or for use in determining a device type of the responding device.

At 214, process 200 can determine whether the Service Description file includes the device type of the device. If the Service Description file does not include information on the device type ("NO" at 214), process 200 can proceed to 216.

At 216, process 200 can query a device identification database for a device type of the responding device. Such a query can include any suitable information which can be used to determine a device type of the device. For example, process 200 can format the query to include information about the manufacturer of the device, a model name of the device, a model description of the device, and a model number of the device (e.g., as determined form the Service Description file). As another example, process 200 can include a model name and a model number of the device in the query. Additionally, the database query can be sent to a database in any suitable format and to any suitable location of the database. For example, the database query can be sent using HTTP and can be formatted as a string of text including an address of the device and various fields, a reference to a document, or any other suitable format. The database can return information in any suitable format. For example, the database can return an indication of a device type of responding device for which the query was sent. As another example, the database can return a true/false response to indicate whether the responding device is a particular type of device (e.g., a television). Additionally, in some implementations, the database can return a response that the device type of the responding device is unknown and/or cannot be determined.

If it is determined at 214 that the Service Description file includes information on the device type of the responding device ("YES" at 214), process 200 can proceed to 218. At 218, process 200 can cause any suitable device details extracted at 204 and/or 212 to be cached for later use. For example, process 200 can cause the UUID, URL, and device type to be cached. As another example, all information received from the responding device can be cached in any suitable format. As yet another example, device details for certain types of devices can be cached and device details for other types of devices can be ignored. In a more particular example, device details for devices on the network that are identified as televisions can be cached, and device details for all other devices can be ignored.

At 220, process 200 can indicate the presence of the responding device on the network and/or a type of the device. In some implementations, process 200 can be configured to indicate the presence of only a particular type or particular types of devices on the current network. For example, process 200 can be configured to only indicate the presence of a television on the current network. As another example, process 200 can be configured to indicate the presence of media sources on the network (e.g., network attached storage, a personal computer with a media library, a game console that includes media that can be played, etc.). Alternatively, process 200 can be configured to indicate the presence of all devices detected on the network. In some implementations, specified device details about the device can be reported by process 200 at 220.

In some embodiments, after process 200 begins, UDP unicast responses can be received asynchronously from one or more devices on the network concurrently and therefore, 204-220 can be performed for each reply received.

Referring back to FIG. 1, as described above in connection with 106, if process 100 determines that cached device details exist for the current network, process 100 can initiate a full device discovery protocol at 110 and a shortened discovery protocol at 112. At 112, process 100 can execute a shortened discovery protocol based on cached device details. In some implementations, the shortened discovery process can include sending a message (e.g., a unicast message) to each device for which there are cached device details. Additionally, process 100 can be configured to detect the presence of a particular type or particular types of devices on the current network, the shortened discovery protocol can be executed for only devices having cached device details that indicate that the device is of the particular type or particular types. In some implementations, the shortened discovery protocol and/or the full discovery protocol can be executed without executing both discovery protocols in parallel when cached device details exist for the current network.

Figure 3:
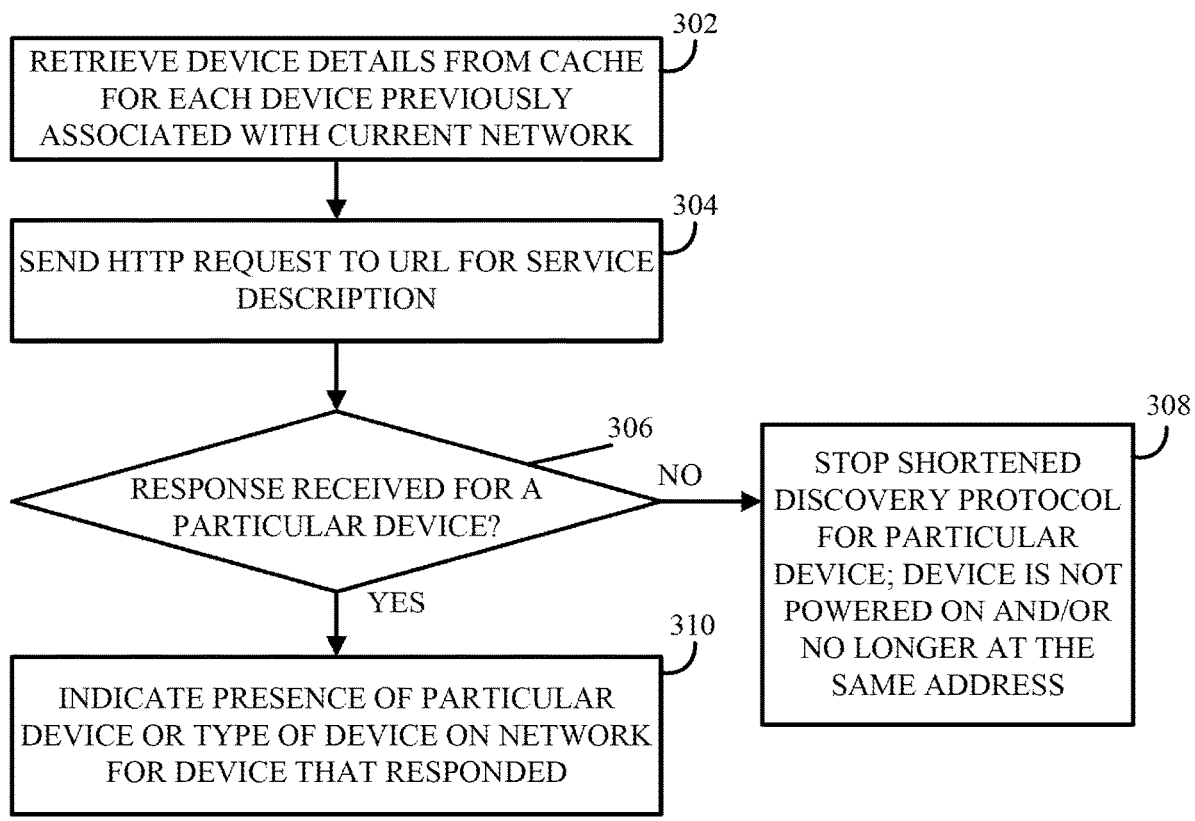
FIG. 3 shows an example of a shortened discovery protocol for discovering the presence of previously discovered digital media devices on a network in accordance with some implementations of the disclosed subject matter.

FIG. 3 shows an example 300 of a process for executing a shortened discovery process based on cached device details for devices previously discovered on the current network. At 302, process 300 can retrieve cached device details for each device (or each device of a particular device type or particular device types) previously discovered in association with the current network (e.g., using the full discovery process described above in connection with FIG. 1 and/or FIG. 2). For example, a URL at which a Service Description file for the cached device can be retrieved from the cache.

At 304, process 300 can cause the mobile device executing process 300 to send an HTTP request to the URL cached for each device for which device details are retrieved at 302. For example, the HTTP request sent at 304 can be similar to an HTTP request described above in connection with 212 of FIG. 2.

At 306, process 300 can determine whether a response has been received for a particular device. If a response has not been received after a predetermined amount of time ("NO" at 306), process 300 can proceed to 308. At 308, process 300 can stop the shortened discovery protocol with respect to the particular device for which a response is not received. In some implementations, a device may not respond to the HTTP request sent at 304 if the device is powered off and/or if an address of the device changed since the device details for the device were cached, or for any other suitable reason.

Otherwise, if a response is received ("YES" at 306), process 300 can proceed to 310. At 310, process 300 can indicate that the particular device from which a response is received at 306 is present on the network. Additionally or alternatively, process 300 can indicate that a device of a particular type corresponding to a device type of the device from which a response is received at 306 is present on the network.

Referring back to FIG. 1, at 114, process 100 can indicate the presence of devices on the network that were detected using the shortened discovery protocol and/or the full discovery protocol. As described above, the presence of individual devices can be indicated and/or the presence of a device of a particular type can be indicated. For example, the presence of individual devices can be indicated and information related to the device (e.g., retrieved from the cache and/or determined from the Service Description file received in response to the HTTP request), such as the presence of a television along with a name and/or address of the television, the presence of a personal computer on a network along with a name and/or address of the personal computer, etc. As another example, if a television is discovered on the network (e.g., using the full discovery protocol and/or the shortened discovery protocol) the presence of a television can be indicated at 114 without identifying any particular information about the television.

In some implementations, when the mobile device executing process 100 is connected to a local area network, the mobile device can periodically execute the full discovery protocol and/or the shortened discovery protocol to determine if any devices that were previously not present on the network have been connected to the network (e.g., by being powered on). Additionally, the full discovery protocol can be executed less frequently than the shortened discovery protocol as it takes more time and may be a more intensive process (e.g., involving more actions and/or greater time waiting for responses).

The mechanisms described herein can be used in a variety of applications. For example, the mechanisms described herein can be used to determine if a particular type of device is present on a network prior to performing an action related to the device. In a more particular example, the mechanisms described herein can be used to detect the presence of a television on a local network, and in response to detecting the presence of the television, prompt the user for permission to record audio in order to identify what is being presented by the television. As another example, the mechanisms described herein can be used to detect the presence of a media playback device on a network that can play back content discovered using a device executing the mechanisms described herein. As yet another example, the mechanisms described herein can be used to find devices on a network with which content can be shared from a device executing the mechanisms described herein.

Figure 4:
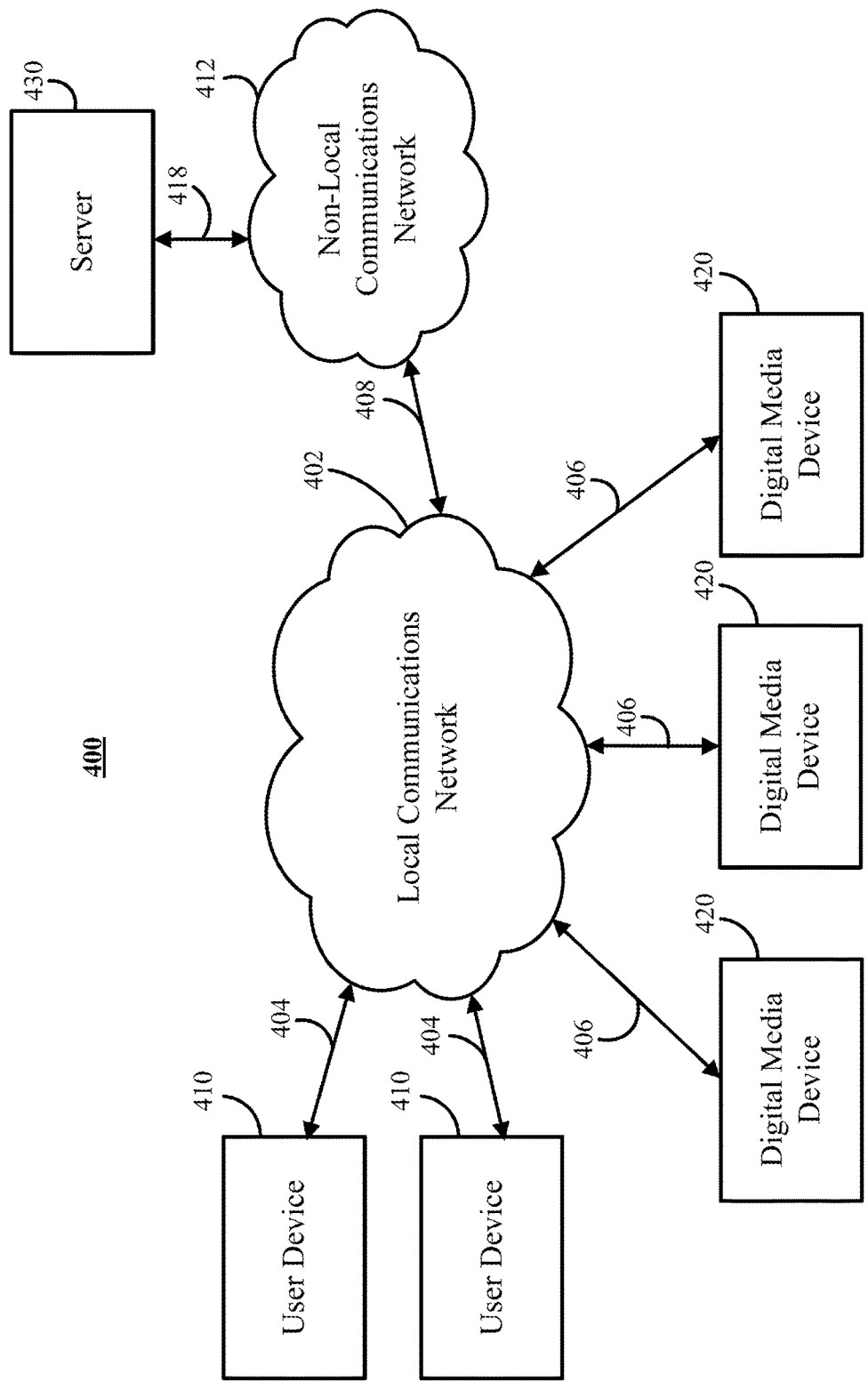
FIG. 4 shows a schematic diagram of an illustrative system suitable for implementation of mechanisms described herein for detecting the presence of a digital media device in accordance with some implementations of the disclosed subject matter.

FIG. 4 shows an example 400 of a generalized schematic diagram of a system on which the mechanisms for detecting the presence of a digital media device on a network as described herein can be implemented in accordance with some implementations. As illustrated, system 400 can include one or more user devices 410. User devices 410 can be local to each other or remote from each other. User devices 410 can be connected by one or more communications links 404 to a local communications network 402 that can be linked via one or more communications links 406 to one or more digital media devices 420. Digital media devices 420 can be local to each other or remote from each other. For example, digital media devices 420 can be connected to each other over local communications network 402. User devices 410 and digital media devices 420 can be connected by communications links 404 and 406 respectively to a non-local communications network 412 via a communications link 408, which can in turn be connected to server 430 via a communications link 418.

System 400 can include one or more servers 430. Server 430 can be any suitable server for providing access to the mechanisms described herein for detecting the presence of a digital media device on a network and/or for providing a device identification database, such as a processor, a computer, a data processing device, or any suitable combination of such devices. For example, the mechanisms for detecting the presence of a digital media device on a network can be distributed into multiple backend components and multiple frontend components and/or interfaces. In a more particular example, backend components, such as data collection mechanisms, data distribution mechanisms, device type lookup mechanisms, etc., can be performed on one or more servers 430. In another particular example, frontend components, such as a user interface, data entry mechanisms, device discovery protocol mechanisms, etc., can be performed on one or more user devices 410.

In some implementations, each of the user devices 410, digital media devices 420, and server 430 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 410 can be implemented as a smartphone, a tablet computer, a mobile telephone, a wearable computer, a personal data assistant (PDA), a personal computer, a laptop computer, a digital media receiver, a set-top box, a smart television, a home entertainment system, a game console, any other suitable computing device, or any suitable combination thereof. As another example, digital media device 420 can be implemented as smart television, a television, a digital projector, a personal computer, a laptop computer, a digital media receiver, a set-top box, a home entertainment system, a game console, any other suitable computing device, or any suitable combination thereof.

Local communications network 402 can be any suitable computer network or combination of such networks including a local-area network (LAN), a wireless network, a Wi-Fi network, a digital subscriber line (DSL) network, a frame relay network, an asynchronous transfer mode (ATM) network, a virtual private network (VPN), an intranet, etc. Non-local communications network 412 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), etc. Communications links 404, 406, 408, and 418 can be any communications links suitable for communicating data among user devices 410, digital media devices 420, and server 430, such as network links, dial-up links, wireless links, hard-wired links, any other suitable communications links, or any suitable combination of such links. User devices 410 can enable use of any of the techniques described herein that can allow the features of the mechanisms to be used. User devices 410 and server 430 can be located at any suitable location.

Figure 5:
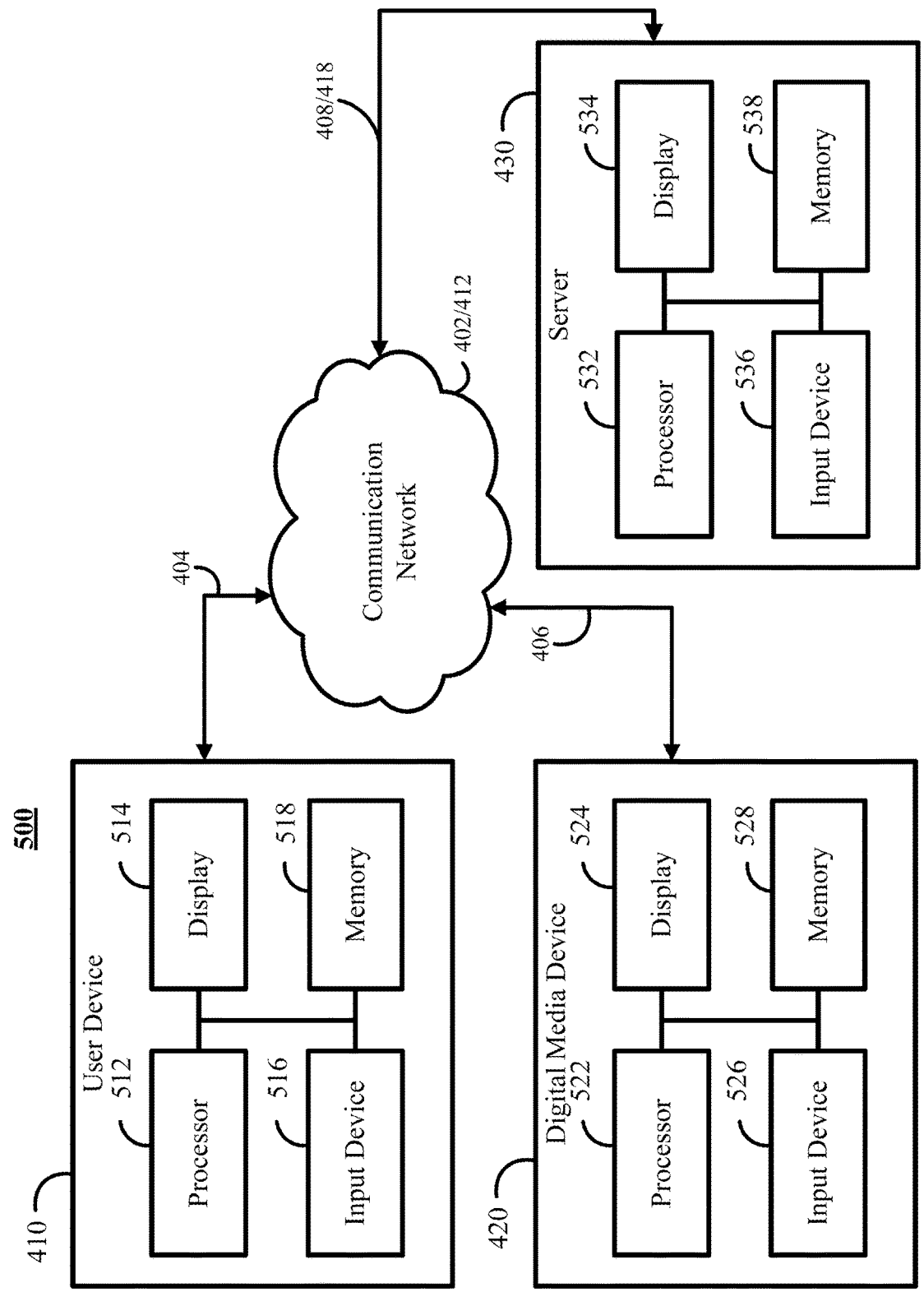
FIG. 5 shows a detailed example of a user device, a digital media device, and a server of FIG. 4 that can be used in accordance with some implementations of the disclosed subject matter.

FIG. 5 illustrates an example 500 of hardware that can be used to implement one or more of user devices 410, digital media devices 420, and servers 430 depicted in FIG. 4 in accordance with some implementations of the disclosed subject matter. Referring to FIG. 5, user device 410 can include a hardware processor 512, a display 514, an input device 516, and memory 518, which can be interconnected. In some implementations, memory 518 can include a storage device (such as a non-transitory computer-readable medium) for storing a computer program for controlling hardware processor 512. In some implementations, memory 518 can include the device details cache described above in connection with FIGS. 1-3.

Hardware processor 512 can use the computer program to execute the mechanisms described herein for detecting the presence of a digital media device, such as digital media device 420, on a network, such as local communications network 402, and to send and receive data through communications link 404. In some implementations, hardware processor 512 can send and receive data through communications link 404 or any other communication links using, for example, a transmitter, a receiver, a transmitter/receiver, a transceiver, or any other suitable communication device. Display 514 can include a touchscreen, a flat panel display, a cathode ray tube display, a projector, a speaker or speakers, and/or any other suitable display and/or presentation devices. Input device 516 can be a computer keyboard, a computer mouse, a touchpad, a voice recognition circuit, a touchscreen, and/or any other suitable input device.

Digital media device 420 can include a hardware processor 522, a display 524, an input device 526, and memory 528, which can be interconnected. In some implementations, memory 528 can include a storage device (such as a non-transitory computer-readable medium) for storing a computer program for controlling hardware processor 522.

Hardware processor 522 can use the computer program to present on display 524 digital and/or analog media content, and to send and receive data through communications link 406. In some implementations, hardware processor 522 can send and receive data through communications link 406 or any other communication links using, for example, a transmitter, a receiver, a transmitter/receiver, a transceiver, or any other suitable communication device. Display 524 can include a touchscreen, a flat panel display, a cathode ray tube display, a projector, a speaker or speakers, and/or any other suitable display and/or presentation devices. Input device 526 can be a remote control, a computer keyboard, a computer mouse, a touchpad, a voice recognition circuit, a touchscreen, and/or any other suitable input device.

Server 430 can include a hardware processor 532, a display 534, an input device 536, and memory 538, which can be interconnected. In some implementations, memory 538 can include a storage device for storing data received through communications link 418 or through other links. The storage device can further include a server program for controlling hardware processor 532. In some implementations, memory 538 can include the device identification database, and hardware processor 532 can receive queries to the device identification database from user devices 410 and transmit responses back to a requesting user device 410.

Hardware processor 532 can use the server program to communicate with user devices 410 as well as provide access to and/or copies of the mechanisms described herein. It should also be noted that data received through communications link 418 or any other communications links can be received from any suitable source. In some implementations, hardware processor 532 can send and receive data through communications link 418 or any other communication links using, for example, a transmitter, a receiver, a transmitter/receiver, a transceiver, or any other suitable communication device. In some implementations, hardware processor 532 can receive commands and/or values transmitted by one or more user devices and/or one or more users of server 430, such as a user that manually enters device information in the device identification database. Display 534 can include a touchscreen, a flat panel display, a cathode ray tube display, a projector, a speaker or speakers, and/or any other suitable display and/or presentation devices. Input device 536 can be a computer keyboard, a computer mouse, a touchpad, a voice recognition circuit, a touchscreen, and/or any other suitable input device.

In some implementations, server 430 can be implemented in one server or can be distributed as any suitable number of servers. For example, multiple servers 430 can be implemented in various locations to increase reliability and/or increase the speed at which the server can communicate with user devices 410.

In some implementations, the mechanisms described herein can be executed by a digital media device to detect the presence of a user device on a network. For example, a television can execute the mechanisms described herein to detect the presence of a mobile device on a network to which the television is connected.

In some implementations, the mechanisms described herein can include server-side software, client-side software, server-side hardware, client-side hardware, firmware, or any suitable combination thereof. For example, these mechanisms can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor to execute the mechanisms described herein. For instance, these mechanisms can encompass a computer program written in a programming language recognizable by user device 410, digital media device 420, and/or server 430 that is executing the mechanisms (e.g., a program written in a programming language, such as, Java, C, Objective-C, C++, C #, JavaScript, Visual Basic, HTML, XML, ColdFusion, any other suitable approaches, or any suitable combination thereof).

In situations in which the mechanisms described herein collect personal information about users, or can make use of personal information, the users can be provided with an opportunity to control whether programs or features collect user information (e.g., information about cached device details on a user's user device, devices discovered on networks to which the user device is connected, an address from which a database query is sent, a social network, social actions or activities, profession, a user's preferences, or a user's current location), or to control whether and/or how to receive content from the server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a content server.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some implementations of the disclosed subject matter, the above described steps of the processes of FIGS. 1-3 can be executed or performed in any order or sequence not limited to the order and sequence shown and described in the figures. Also, some of the above steps of the processes of FIGS. 1-3 can be executed or performed substantially simultaneously where appropriate or in parallel to reduce latency and processing times. Furthermore, it should be noted that FIGS. 1-3 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for detecting the presence of a digital media device on a network are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for detecting a presence of a digital media device, the method comprising:
in response to a full device discovery protocol search that initially discovers devices on a local area network and that requests details for the devices associated with a local area network determining that a first media device is a particular device type present on the local area network and in response to a shortened device discovery protocol search that checks for presence of devices that were previously detected on the local area network and that requests cached device details associated with the local area network determining that a second media device is the particular device type present on the local area network, presenting, using the hardware processor, a first indication and a second indication that indicate presence of devices of a particular type on the local area network; and
performing, using the hardware processor, an action associated with at least one of the first digital media device and the second digital media device based on the particular type of device present on the local area network.

2. The method of claim 1, further comprising:
receiving an instruction to detect the presence of the particular type of media device on the local area network; and
determining whether a local cache includes cached device details corresponding to one or more devices that have been previously associated with the local area network in response to receiving the instruction to detect the presence of the particular type of digital media device on the local area network, wherein the full device discovery protocol search and the shortened device discovery protocol search are concurrently initiated in response to determining that the local cache includes the cached device details corresponding to the one or more devices that have been previously associated with the local area network.

3. The method of claim 2, further comprising storing at least a portion of device details received using the full device discovery protocol and the particular device type of the first digital media device in the local cache in response to the full device discovery protocol determining that the first digital media device is the particular device type present on the local area network.

4. The method of claim 1, wherein the full discovery protocol search is a simple device discovery protocol (SSDP) search that comprises:
sending a multicast message on the local area network that requests device details for devices that are connected to the local area network;
receiving, in response to sending the multicast message, a unicast reply that includes a link to a service description file corresponding to the first digital media device;
in response to receiving the unicast reply, accessing the service description file and determining whether a device type and received device details of the first digital media device are included in the service description file from the unicast reply; and
comparing the received device details to the cached device details to determine whether the first digital media device corresponds to one of the one or more devices previously associated with the local area network.

5. The method of claim 4, wherein the SSDP search further comprises:
querying a device type identification database using at least a portion of the received requested device details in response to determining (a) that the received requested details do not include the device type of the first digital media device and (b) that the first digital media device does not correspond to one of the one or more devices previously associated with the local area network, based on the comparison of the received device details to the cached device details;
receiving an identified device type of the first digital media device in response to querying the device type identification database; and
determining that the device type of the first digital media device is the same as the particular device type.

6. The method of claim 5, wherein the SSDP search further comprises sending a unicast message requesting the service description file from the replying device to an address associated the identified cached digital media device using HTTP, and wherein determining whether the device type of the at least one digital media device is included in the received device details further comprises checking the service description file for the device type.

7. The method of claim 4, wherein the SSDP search further comprises:
sending a user datagram protocol (UDP) multicast message on the local area network that requests device details for devices that are connected to the local area network; and
receiving a UDP unicast reply that includes a universally unique identifier (UUID) of the at least one digital media device and a uniform resource locator (URL) for the service description file corresponding to the at least one digital media device.

8. The method of claim 7, further comprising:
comparing the received UUID to the cached device details to determine whether device details are already cached for the responding device; and
comparing the received device details to the cached device details further comprises comparing the received URL to a URL in the cached device details to determine if the URL has changed.

9. The method of claim 1, wherein the shortened device discovery protocol search further comprises identifying the second digital media device that is of the particular type from among the one or more devices previously associated with the local area network from the local cache.

10. The method of claim 9, wherein the shortened device discovery protocol search further comprises:
sending a unicast message to an address associated with the second digital media device using hypertext transfer protocol (HTTP) in response to identifying that the second digital media device is of the particular type; and
receiving a reply to the unicast message from the second digital media device indicating that the second digital media device is present on the local area network.

11. A system for detecting a presence of a digital media device, the system comprising:

a memory; and a hardware processor that, when executing computer executable instructions stored in the memory, is configured to:

in response to a full device discovery protocol search that initially discovers devices on a local area network and that requests details for the devices associated with a local area network determining that a first media device is a particular device type present on the local area network and in response to a shortened device discovery protocol search that checks for presence of devices that were previously detected on the local area network and that requests cached device details associated with the local area network determining that a second media device is the particular device type present on the local area network, present a first indication and a second indication that indicate presence of devices of a particular type on the local area network; and perform an action associated with at least one of the first digital media device and the second digital media device based on the particular type of device present on the local area network.

12. The system of claim 11, wherein the hardware processor is further configured to:

receive an instruction to detect the presence of the particular type of media device on the local area network; and determine whether a local cache includes cached device details corresponding to one or more devices that have been previously associated with the local area network in response to receiving the instruction to detect the presence of the particular type of digital media device on the local area network, wherein the full device discovery protocol search and the shortened device discovery protocol search are concurrently initiated in response to determining that the local cache includes the cached device details corresponding to the one or more devices that have been previously associated with the local area network.

13. The system of claim 12, wherein the hardware processor is further configured to store at least a portion of device details received using the full device discovery protocol and the particular device type of the first digital media device in the local cache in response to the full device discovery protocol determining that the first digital media device is the particular device type present on the local area network.

14. The system of claim 11, wherein the full discovery protocol search is a simple device discovery protocol (SSDP) search that comprises:

sending a multicast message on the local area network that requests device details for devices that are connected to the local area network;

receiving, in response to sending the multicast message, a unicast reply that includes a link to a service description file corresponding to the first digital media device;

in response to receiving the unicast reply, accessing the service description file and determining whether a device type and received device details of the first digital media device are included in the service description file from the unicast reply; and comparing the received device details to the cached device details to determine whether the first digital media device corresponds to one of the one or more devices previously associated with the local area network.

15. The system of claim 14, wherein the SSDP search further comprises:

querying a device type identification database using at least a portion of the received requested device details in response to determining (a) that the received requested details do not include the device type of the first digital media device and (b) that the first digital media device does not correspond to one of the one or more devices previously associated with the local area network, based on the comparison of the received device details to the cached device details;

receiving an identified device type of the first digital media device in response to querying the device type identification database; and determining that the device type of the first digital media device is the same as the particular device type.

16. The system of claim 15, wherein the SSDP search further comprises sending a unicast message requesting the service description file from the replying device to an address associated the identified cached digital media device using HTTP, and wherein determining whether the device type of the at least one digital media device is included in the received device details further comprises checking the service description file for the device type.

17. The system of claim 14, wherein the SSDP search further comprises:

sending a user datagram protocol (UDP) multicast message on the local area network that requests device details for devices that are connected to the local area network; and receiving a UDP unicast reply that includes a universally unique identifier (UUID) of the at least one digital media device and a uniform resource locator (URL) for the service description file corresponding to the at least one digital media device.

18. The system of claim 17, wherein the hardware processor is further configured to:

compare the received UUID to the cached device details to determine whether device details are already cached for the responding device; and compare the received device details to the cached device details further comprises comparing the received URL to a URL in the cached device details to determine if the URL has changed.

19. The system of claim 11, wherein the shortened device discovery protocol search further comprises identifying the second digital media device that is of the particular type from among the one or more devices previously associated with the local area network from the local cache.

20. The system of claim 19, wherein the shortened device discovery protocol search further comprises:

sending a unicast message to an address associated with the second digital media device using hypertext transfer protocol (HTTP) in response to identifying that the second digital media device is of the particular type; and receiving a reply to the unicast message from the second digital media device indicating that the second digital media device is present on the local area network.

21. A non-transitory computer-readable medium containing computer executable instructions that, when executed by a processor, cause the processor to perform a method for detecting a presence of a digital media device, the method comprising:

in response to a full device discovery protocol search that initially discovers devices on a local area network and that requests details for the devices associated with a local area network determining that a first media device is a particular device type present on the local area network and in response to a shortened device discovery protocol search that checks for presence of devices that were previously detected on the local area network and that requests cached device details associated with the local area network determining that a second media device is the particular device type present on the local area network, presenting, using the hardware processor, a first indication and a second indication that indicate presence of devices of a particular type on the local area network; and performing, using the hardware processor, an action associated with at least one of the first digital media device and the second digital media device based on the particular type of device present on the local area network.

* * * * *